Dec. 31, 1929.     G. J. THOMAS     1,741,168
BRAKE
Filed March 25, 1927
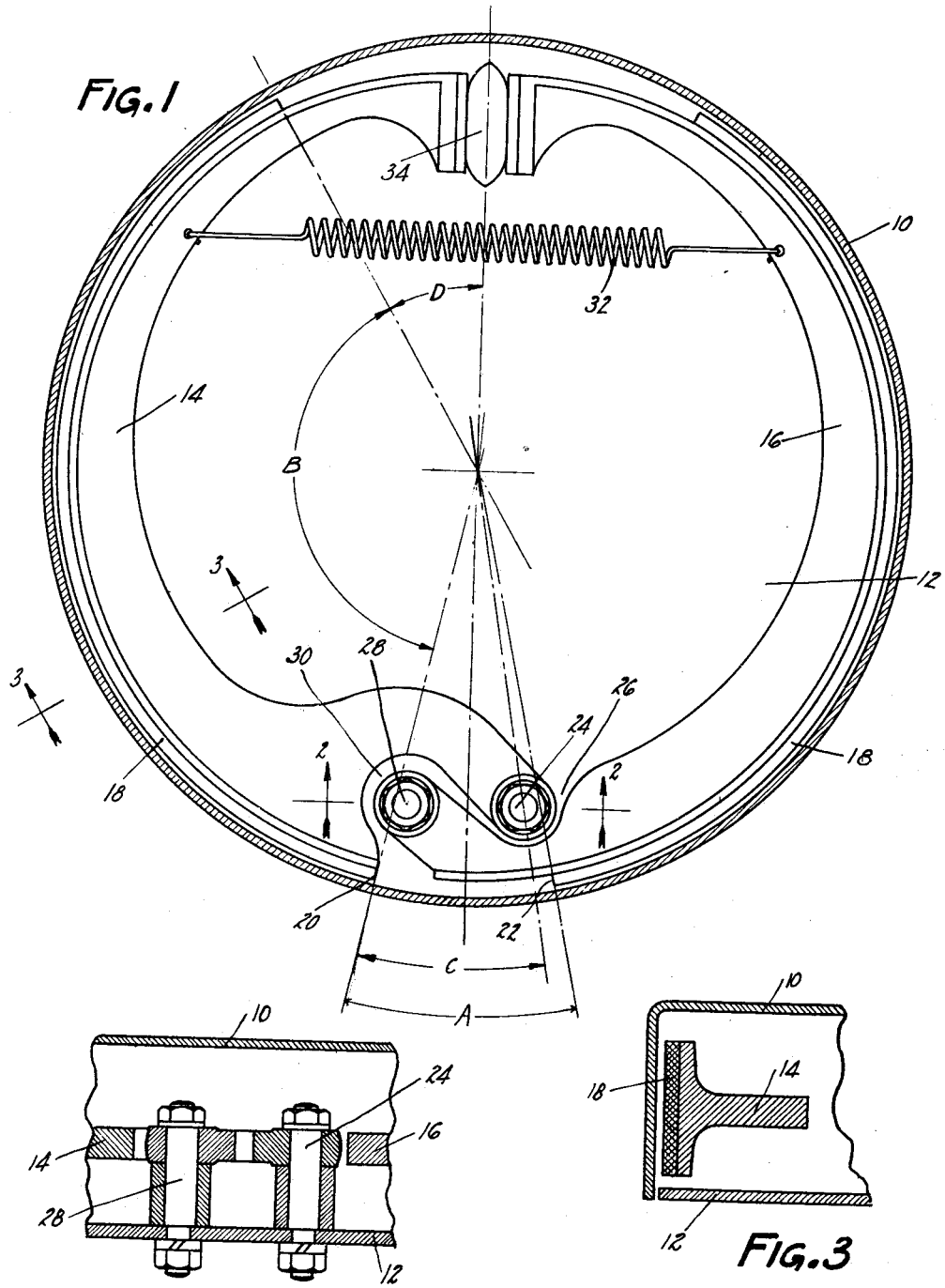
INVENTOR
GEORGE J. THOMAS
BY
*M. W. McConkey*
ATTORNEY Patented Dec. 31, 1929

1,741,168

UNITED STATES PATENT OFFICE

GEORGE JOSEPH THOMAS, OF SOUTH BEND, INDIANA, ASSIGNOR TO BENDIX BRAKE COMPANY, OF CHICAGO, ILLINOIS, A CORPORATION OF ILLINOIS

BRAKE

Application filed March 25, 1927. Serial No. 178,193.

This invention relates to brakes, and is illustrated as embodied in an internal expanding automobile brake. An object of the invention is to arrange the brake shoes, or their equivalents, so that the friction surfaces (e. g. of the brake lining) will have a maximum degree of effective engagement with the brake drum.

Having this object in view, I bring the friction surfaces on adjacent shoes, or other friction devices, immediately adjacent each other at the "heels" of the shoes, the necessary "throw" or extent of angular movement of the "heels" of the shoes,—i. e. of the ends of the friction surfaces nearest the anchors,— being obtained by positioning each of the anchors well past the end of the other shoe, thus overlapping or "cross-anchoring" the shoes. When possible, the anchor should be set back between the ends of the friction surface of the other shoe.

In the embodiment illustrated in the drawing, the anchored ends of the shoe overlap as described above, while the free ends, arranged adjacent each other across the drum from the anchors, are engaged by an applying device such as a double cam. The shoes being operated jointly by the cam or its equivalent, another advantage of the invention will be noted, in that practically the entire inner drum surface is engaged uniformly by the shoes, thus distributing the pressure over the entire drum and entirely obviating drum distortion, and moreover greatly minimizing the chance of the localized high pressures which cause brake "squeal".

Another feature of novelty relates to securing intimate contact of a friction member with the drum, while at the same time retaining absolute control over it, by providing shoes of sufficient flexibility to conform to the drum, while at the same time the shoes are so formed as to permit of the desired control. Preferably the shoe is relatively flexible adjacent its free end, where the "wrapping" or "servo" effect is greatest, and tapers to a substantially rigid construction at the anchored end, so that the part of the shoe spaced away from the applying device is not sufficiently flexible to permit uncontrolled servo action or "grabbing".

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the shoes in side elevation;

Figure 2 is a partial section on the line 2—2 of Figure 1, showing the anchor arrangement; and Figure 3 is a partial section on the line 3—3 of Figure 1, showing the shoe structure.

The illustrated embodiment of the invention includes a brake drum 10, at the open side of which is a suitable support such as a backing plate 12, and within which are arranged a plurality of novel shoes or friction devices 14 and 16. Each shoe is shown as T-shaped in cross-section, and as provided with suitable brake lining 18 or other friction material forming a friction face for the shoe.

An important feature of the invention relates to arranging the anchors of the brake so that the shoes overlap each other, thus permitting the adjacent ends of the linings 18 at the "heels" 20 and 22 to be brought very close together. To this end, shoe 14 is anchored on a pivot 24 between the ends of the friction face of shoe 16, the web of shoe 16 being cut away at 26 to permit of this arrangement, while anchor 28 for shoe 16 is similarly arranged between the ends of shoe 14, which is cut away at 30.

The brake is applied, against the resistance of a suitable return spring 32, by means such as a double cam 34 arranged across the drum from the anchors 24 and 28.

An important feature of novelty relates to forming the shoes to be relatively flexible adjacent their free ends, where they have their maximum self-energizing or wrapping action by the wedging force of the drum, for example by reducing the depth of the central stiffening flange, while at the same time guarding against "grabbing" by tapering the web toward the anchor until the shoe is substantially rigid at its anchored end. This permits absolute control of the shoe by cam 34 and spring 32, while at the same time there is a high degree of wedging or servo action by the rotating drum on the shoe (on shoe 16 when the drum is turning clockwise, and on shoe 14 when in the opposite direction).

An important object of overlapping the shoes as described above is to bring the heels 20 and 22 as close together as possible,—i. e. to minimize the angle "A",—for the double purpose of securing a greater area of engagement with the drum, and of supporting the entire drum to prevent distortion.

With a two-shoe brake such as selected for illustration, the angular length "B" of the lining on the shoe must be less than 180°; the nearer it approaches 180° the more effective it will be, while the less will be the clearance at the point 20 (or 22) when the brake is released, with a given angular releasing movement of the shoe. Conversely, the more the angle "B" is less than 180°, the less effective angular length of the lining will have, and the more clearance will be secured when the brake is released.

The approach of the lining (i. e. of point 20 or 22) to the anchor 24 (or 28) is thus definitely limited to a certain minimum angle "C" which will give the necessary clearance when the brake is released. In an ordinary two-shoe brake, therefore, there is a gap at least double the angle "C" between the ends of the linings on the two shoes, at their anchored ends, instead of the small gap "A" when the novel cross-anchored shoes are used. When the end of the lining is spaced some angle "D" from the cam axis, perhaps 15°, it is even possible to use shoes more than 180° long, as shown in the drawing.

The nearer anchors 24 and 28 are to the periphery of the drum, the shorter the angle "C" may be made. On the other hand, the nearer the anchors are to the center of the drum, the greater the wedging or "servo" action of the drum on the shoes. In any given case, the radial positions of the anchors will have to be selected according to the wedging or servo action desired, to give as light a pedal pressure as may be desired, whereupon the necessity for a certain clearance at 20 (or 22) will fix the size of the angle "C".

While one illustrative embodiment has been described in detail, it is not my intention to limit the scope of the invention to that particular embodiment, or otherwise than by the terms of the appended claims. Most of the subject-matter of this application is continued from my prior co-pending application No. 743,877, filed October 16, 1924.

I claim:

1. A brake mechanism, including brake-actuating means and brake shoes having their anchor points arranged in over-lapping relationship and at least one of said anchor points being arcuately spaced, reckoned in the direction of its length, more than 180° from the nose of the shoe adjacent said actuating means.

2. A brake mechanism comprising a drum, a pair of separately-anchored overlapping shoes, each having an arcuate length of more than 180°, and means for expanding the shoes simultaneously against the inside of the drum, the overlapping parts of the shoes being opposite said means.

3. A brake mechanism comprising a pair of brake shoes with means for actuating the same, each of said shoes having its anchor point arcuately spaced in the direction of its length more than 180° from the axis of said actuating means.

4. A brake mechanism comprising a pair of brake shoes oppositely disposed within a drum, means for expanding said shoes into contact with the drum, each of said shoes having an arcuate length of more than 180°, the overlapping parts of the shoes being anchored separately from each other opposite said means.

5. A brake comprising, in combination, a drum, a pair of friction devices within the drum, an anchor for each of said devices between the ends of the other device, and an expanding device between and engageable with the unanchored ends of said devices.

6. A brake comprising, in combination, a drum, a pair of friction devices within the drum, an anchor for each of said devices between the ends of the other device, and a cam between and engageable with the unanchored ends of said devices.

7. In brake mechanism for engaging a rotatable drum, means for increasing the effectiveness of said mechanism comprising overlapping brake shoes independently anchored and having adjacent unanchored ends, and simultaneously actuated in opposite directions.

In testimony whereof, I have hereunto signed my name.

GEORGE JOSEPH THOMAS.